(12) United States Patent
Leffler et al.

(10) Patent No.: US 7,704,390 B2
(45) Date of Patent: Apr. 27, 2010

(54) WASTEWATER TREATMENT SYSTEM

(75) Inventors: Charles E. Leffler, Lighthouse Point, FL (US); William Paul, Olathe, KS (US)

(73) Assignee: Ionz Bluewater Solutions, Inc., Royal Palm Beach, FL (US)

( * ) Notice: Subject to any disclaimer, the term of this patent is extended or adjusted under 35 U.S.C. 154(b) by 967 days.

(21) Appl. No.: 10/715,610

(22) Filed: Nov. 18, 2003

(65) Prior Publication Data

US 2004/0099607 A1 May 27, 2004

Related U.S. Application Data

(60) Provisional application No. 60/426,803, filed on Nov. 18, 2002.

(51) Int. Cl.
| | |
|---|---|
| C02F 1/24 | (2006.01) |
| C02F 1/46 | (2006.01) |
| C02F 1/467 | (2006.01) |
| C02F 9/00 | (2006.01) |
| C02F 9/02 | (2006.01) |
| C02F 9/06 | (2006.01) |
| C02F 9/12 | (2006.01) |

(52) U.S. Cl. .................. 210/221.2; 210/198.1; 210/199; 210/205; 210/206; 210/194; 210/196; 210/764; 210/703; 204/242; 204/267; 204/269; 204/270; 205/756; 205/757

(58) Field of Classification Search .............. 210/221.1, 210/221.2, 748, 198.1, 764, 206, 205, 199, 210/194, 196, 703; 204/157.15, 157.46, 204/157.5, 242, 267, 269, 270; 205/756, 205/757

See application file for complete search history.

(56) References Cited

U.S. PATENT DOCUMENTS

| | | | | |
|---|---|---|---|---|
| 3,767,046 | A | * | 10/1973 | Hartkorn ..................... 210/703 |
| 3,945,918 | A | | 3/1976 | Kirk |
| 3,954,605 | A | * | 5/1976 | Davies et al. ............... 210/608 |
| 3,959,131 | A | | 5/1976 | Ramirez et al. |
| 4,053,399 | A | * | 10/1977 | Donnelly et al. ............ 210/706 |
| 4,248,681 | A | | 2/1981 | Sweeney |
| 4,248,715 | A | | 2/1981 | Olivier |
| 4,256,552 | A | | 3/1981 | Sweeney |
| 4,358,058 | A | | 11/1982 | Bierman |
| 4,361,471 | A | | 11/1982 | Kosarek |
| 4,382,866 | A | | 5/1983 | Johnson |
| D273,411 | S | | 4/1984 | Johnson et al. |
| D273,412 | S | | 4/1984 | Johnson et al. |
| D273,694 | S | | 5/1984 | Johnson et al. |
| D273,695 | S | | 5/1984 | Johnson et al. |
| D273,696 | S | | 5/1984 | Johnson et al. |
| D273,697 | S | | 5/1984 | Johnson et al. |
| D275,513 | S | | 9/1984 | Johnson |
| 4,491,551 | A | | 1/1985 | Johnson |
| 4,525,243 | A | | 6/1985 | Miller |
| 4,562,014 | A | | 12/1985 | Johnson |
| 4,563,286 | A | | 1/1986 | Johnson et al. |
| 4,655,933 | A | | 4/1987 | Johnson et al. |

(Continued)

*Primary Examiner*—Thomas M Lithgow
(74) *Attorney, Agent, or Firm*—Bowditch & Dewey, LLP

(57) ABSTRACT

A wastewater treatment system for removing contaminants from wastewater on a vessel using electricity. The wastewater treatment system may inject wastewater with one or more disinfectants or ionized gases, or both, to remove at least a portion of contaminants from the wastewater. The water treatment system may produce disinfectants from saltwater using one or more disinfectant generators and return the byproducts to a water body. The wastewater treatment system may also pass wastewater through an electrical coagulation unit in which an electrical current may be emitted into the wastewater, whereby flocculants are formed and cause suspended solids and other materials to settle out of the wastewater. The wastewater treatment system may include a secondary treatment system for further reducing concentrations of contaminants. In addition, the wastewater treatment system may include a solid waste treatment system for incinerating solids produced by the wastewater treatment system.

54 Claims, 10 Drawing Sheets

U.S. PATENT DOCUMENTS

| | | | | |
|---|---|---|---|---|
| 4,687,574 A | | 8/1987 | Hellman | |
| 5,180,499 A | * | 1/1993 | Hinson et al. | 210/706 |
| 5,262,047 A | | 11/1993 | Benskin et al. | |
| 5,443,719 A | | 8/1995 | Johnson et al. | |
| 5,538,631 A | | 7/1996 | Yeh | |
| 5,549,800 A | | 8/1996 | Iwata | |
| 5,597,479 A | | 1/1997 | Johnson | |
| 5,616,250 A | | 4/1997 | Johnson et al. | |
| 5,622,622 A | | 4/1997 | Johnson | |
| 5,635,059 A | | 6/1997 | Johnson | |
| 5,674,312 A | | 10/1997 | Mazzei | |
| 5,685,994 A | | 11/1997 | Johnson | |
| 5,728,303 A | | 3/1998 | Johnson | |
| 5,792,369 A | | 8/1998 | Johnson | |
| 5,840,159 A | | 11/1998 | Rosenblad | |
| 5,958,229 A | | 9/1999 | Filiopoulos et al. | |
| 6,277,288 B1 | | 8/2001 | Gargas | |
| 6,332,980 B1 | * | 12/2001 | Moorehead | 210/104 |
| 6,517,713 B2 | | 2/2003 | Gargas | |
| 6,551,518 B2 | | 4/2003 | Gargas | |
| 6,740,245 B2 | | 5/2004 | Johnson | |
| 6,773,603 B2 | * | 8/2004 | Moorehead et al. | 210/704 |
| 6,966,996 B2 | | 11/2005 | Leffler | |
| 2001/0020603 A1 | * | 9/2001 | Moorehead et al. | 210/741 |
| 2002/0170816 A1 | | 11/2002 | Leffler et al. | |
| 2002/0185452 A1 | | 12/2002 | Johnson | |
| 2004/0069611 A1 | | 4/2004 | MacGregor | |
| 2004/0099607 A1 | | 5/2004 | Leffler et al. | |
| 2004/0099608 A1 | | 5/2004 | Leffler et al. | |
| 2004/0206680 A1 | | 10/2004 | Johnson | |

* cited by examiner

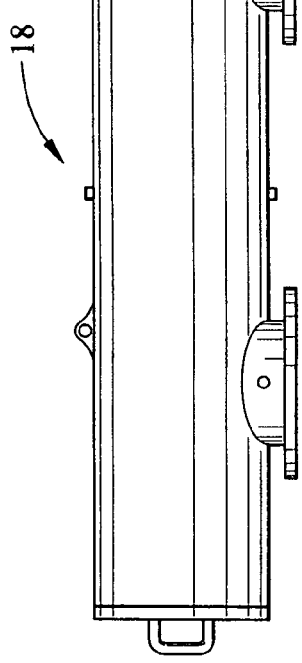
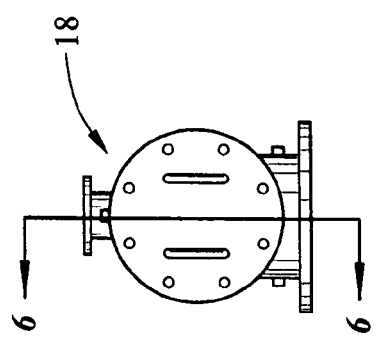
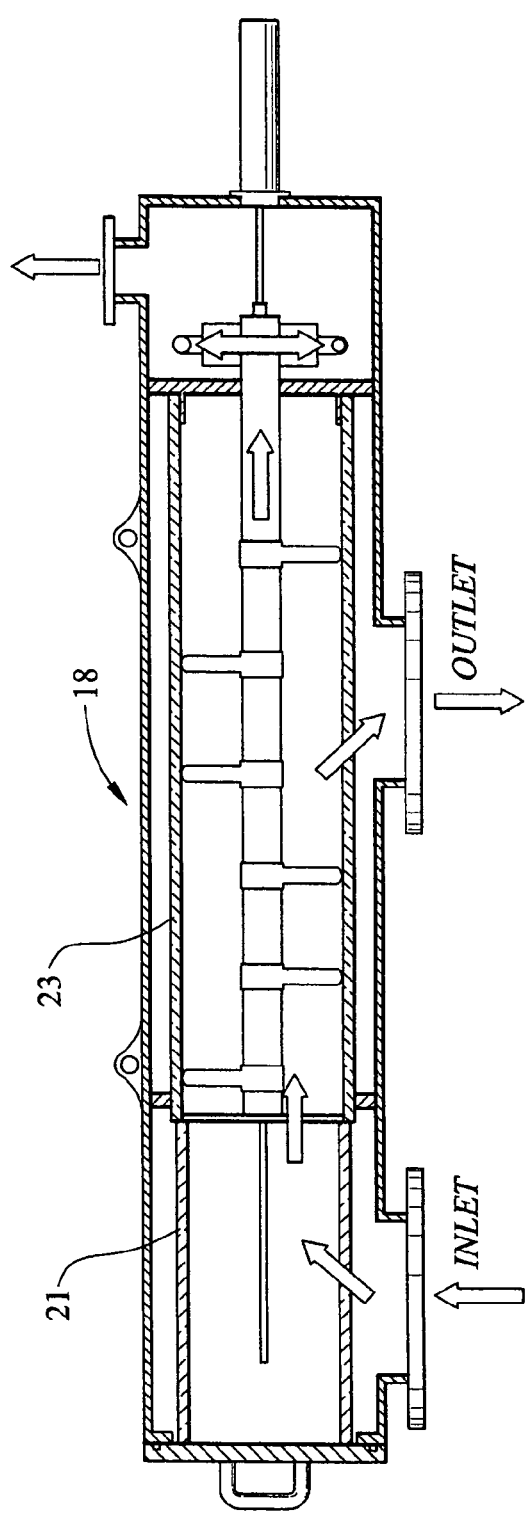

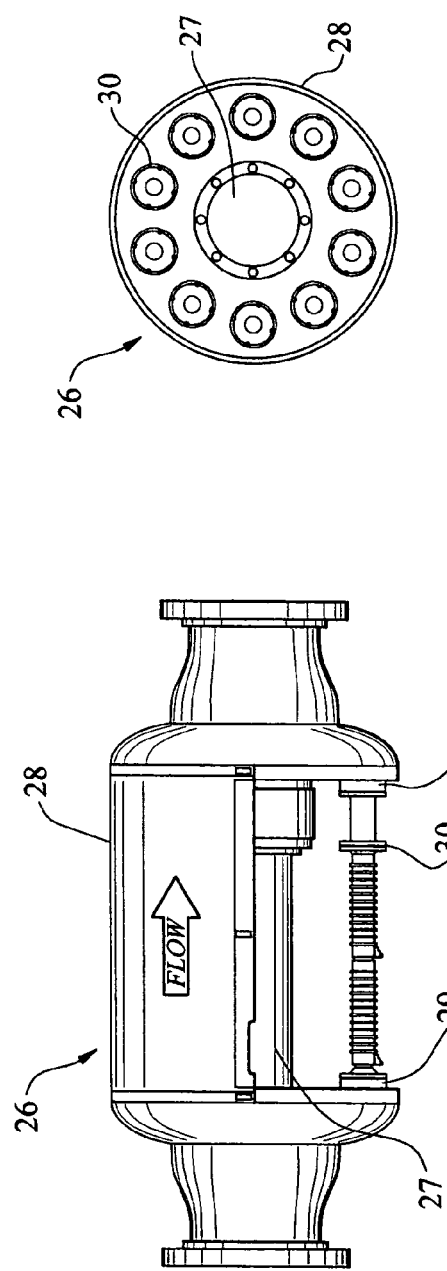
FIG. 7
FIG. 8
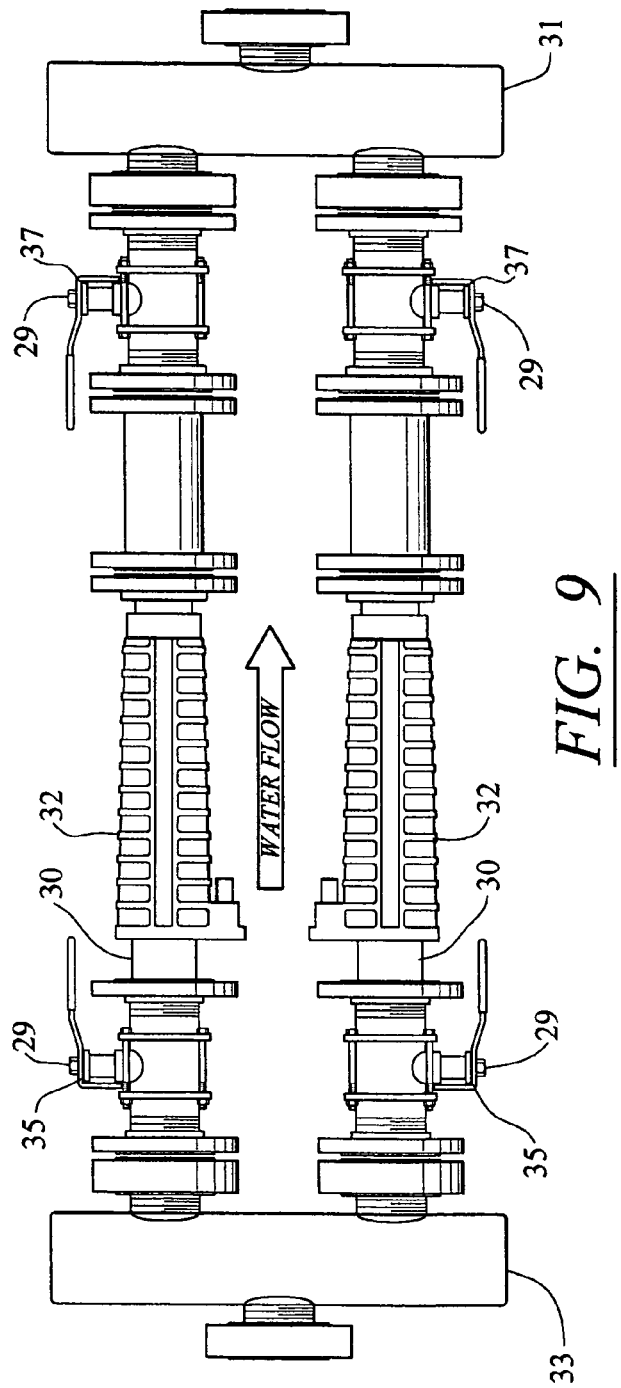
FIG. 9

WASTEWATER TREATMENT SYSTEM

CROSS REFERENCE TO RELATED APPLICATIONS

This application claims the benefit of U.S. Provisional Application No. 60/426,803, filed Nov. 18, 2002.

FIELD OF THE INVENTION

The invention is directed generally to wastewater treatment systems, and more particularly, to wastewater treatment systems usable on vessels.

BACKGROUND

Vessels, such as ships, produce large amounts of wastewater, such as sewage, galley wastewater, and laundry wastewater. Typically, the wastewater is stored on the vessel or discharged from the vessel with little or no treatment. Storage of the wastewater on vessels requires large holding tanks, which consume valuable floor space in a vessel. In addition, the storage tanks often add undesirable weight to a vessel. Typically, storage tanks are emptied at port facilities and treated in land-based water treatment systems or emptied while the vessel is on the high seas.

The option of discharging wastewater overboard reduces the capacity of storage tanks needed and may, in at least some situations, eliminate the need for wastewater storage tanks altogether. However, discharging raw wastewater into a water body can be extremely damaging. Raw wastewater or wastewater having little treatment often is lethal to numerous organisms in offshore and nearshore ecosystems. In addition, regulations in various jurisdictions throughout the world prohibit discharges of contaminated water or limit such discharges.

Thus, a need exists for a water treatment system usable on a vessel for treating wastewater and removing contaminants to an acceptable level allowing wastewater to be discharged overboard without causing adverse effects to the ecosystem in which the wastewater is discharged.

SUMMARY OF THE INVENTION

This invention is directed to a wastewater treatment system for removing one or more contaminants from a wastewater. In at least one embodiment, the wastewater treatment system is configured to remove contaminants from wastewater found on a vessel, such as, but not limited to, a ship, megayacht, or other vessel. Nonetheless, the wastewater treatment system may be used to treat other wastewaters as well. In at least one embodiment, components forming the wastewater system may be formed in modules so as to be easily installed on vessels in often space limited compartments. The wastewater treatment system may remove at least a portion of suspended solids, fecal coliforms, BODs, or CODs, or any combination thereof, from the wastewater using a combination of treatment systems. The wastewater treatment system may inject disinfectants, such as, but not limited to, chlorine, bromine, and other halides, hydrogen peroxide, or other disinfectants, into the wastewater, and may inject one or more ionized gases into the wastewater. One or more of the disinfectants may be generated from saltwater using a disinfectant generator. In at least some embodiments, the ionized gases may be produced on board a vessel to which the wastewater treatment system is attached using an ionized gas generator.

The wastewater treatment system may be formed from a primary treatment system and a secondary treatment system. The primary treatment system may be formed from one or more collection devices for collecting wastewater from one or more sources, which may include, but are not limited to, a laundry, a sewage system, a galley drain, a galley pulper, bilge areas, or other sources, or any combination of these sources. The wastewater treatment system may also include one or more disinfectant injectors for injecting at least one disinfectant into the wastewater treatment system downstream of the collection device. One or more mixers may be included in the wastewater treatment system for mixing one or more ionized gases with the wastewater. The mixers may include a plurality of injectors for injecting ionized gases into the wastewater. In at least one embodiment, the plurality of injectors may be positioned in a helical configuration around the mixer. The wastewater treatment system may also include a dissolved air flotation system for removing suspended solids from the wastewater.

One or more disinfectant generators may be included in the wastewater treatment system for supplying disinfectants to the disinfectant injectors. The disinfectant generator may be formed from one or more conduits in a housing. Each conduit may have an electrical cell for applying an electrical charge to the fluid flowing through the conduit, which, in at least one embodiment, is saltwater. Each conduit may also include one or more sensors for determining the pressure, temperature, and other system parameters. The disinfectant generator may be coupled to an inlet in the hull of a vessel for receiving water from the water body in which the vessel is floating. The water may be drawn from the water body and passed through the disinfectant generator, where one or more disinfectants may be removed from the water. The water may then be returned to the water body.

The wastewater treatment system may also include one or more ionized gas generators for generating ionized gas to inject into the wastewater passing through the system. The ionized gas generator may be formed from one or more chambers, whereby the chambers may include one or more ultraviolet lamps and one or more magnets. In at least one embodiment, the ionized gas generator may include a plurality of ultraviolet lamps that surround a plurality of magnets positioned generally along a longitudinal axis of a chamber. The magnets may be positioned so that ends of adjacent magnets have like polarity, which may widen the magnetic field cast by the magnets. A gas, such as, but not limited to air, may be passed through the ionized gas generator to produce ionized gases.

The wastewater treatment system may also include an electrical coagulation unit for applying an electrical current to the wastewater. In at least one embodiment, the electrical coagulation unit may be formed from a plurality of plates positioned generally parallel to each other and forming a serpentine pathway through which the wastewater flows. The plates may be formed from a material, such as, but not limited to, aluminum, which may break off of the plates during use and form flocculants in the wastewater. The flocculants may adhere to suspended solids in the wastewater, coagulate, and settle out of the wastewater flow.

The wastewater treatment system may also include a filtration system positioned upstream of the collection device for removing suspended solids and other materials from the wastewater treatment system having relatively large sizes. For instance, in at least one embodiment, the wastewater treatment system may include one or more filters sized to filter materials two millimeters (mm) and larger from the wastewater.

The wastewater treatment system may include one or more saturization systems for introducing ionized gases or disinfectants, or both, into the wastewater stream. The saturization system may be formed from a labyrinth of pipes sized for mixing the ionized gases and the disinfectants with the wastewater.

The wastewater treatment system may also include a secondary treatment system positioned downstream of the dissolved air flotation unit for further cleaning the wastewater. The secondary treatment system may or may not be used, depending on the desired levels of contaminants in the wastewater exhausted from the wastewater treatment system. The secondary treatment system may include one or more contact tanks, ozone generators, ionized gas injectors, ionized gas generators, or filters. The wastewater treatment system may also include a recirculation system coupled to a downstream location of the water treatment system for recirculating wastewater through the wastewater treatment system if the wastewater is determined to have levels of contaminants that exceed a selected threshold.

The wastewater treatment system may also include a solid waste treatment system for disposing of the solids generated by the various components of the wastewater treatment system. For instance, the solid waste treatment system may include a buffer tank for collecting solids from the wastewater treatment system, and a separator may be included for dewatering the solids. The dewatered solids may be burned in an incinerator to greatly reduce the size and weight of solids requiring containment until the vessel in which the water treatment system is attached is docked.

An advantage of this system if that the system uses relatively small amounts of chemicals to disinfect wastewater and leaves little residual chemicals in the wastewater emitted from the system.

These and other features and advantages of the present invention will become apparent after review of the following drawings and detailed description of the disclosed embodiments.

BRIEF DESCRIPTION OF THE DRAWINGS

The accompanying drawings illustrate embodiments of this invention and, together with the description, disclose various aspects of the invention. These figures include the following:

FIG. 4 is a front view of a filter usable in the water treatment system;

FIG. 5 is a side view of the filter shown in FIG. 4;

FIG. 6 is a cross-sectional view of the filter shown in FIG. 4 taken at line 6-6;

FIG. 7 is a side view of a disinfectant generator usable in the water treatment system;

FIG. 8 is an end view of the disinfectant generator shown in FIG. 7;

FIG. 9 is a side view of internal components of the disinfectant generator shown in FIG. 7;

DETAILED DESCRIPTION

Figure 1:
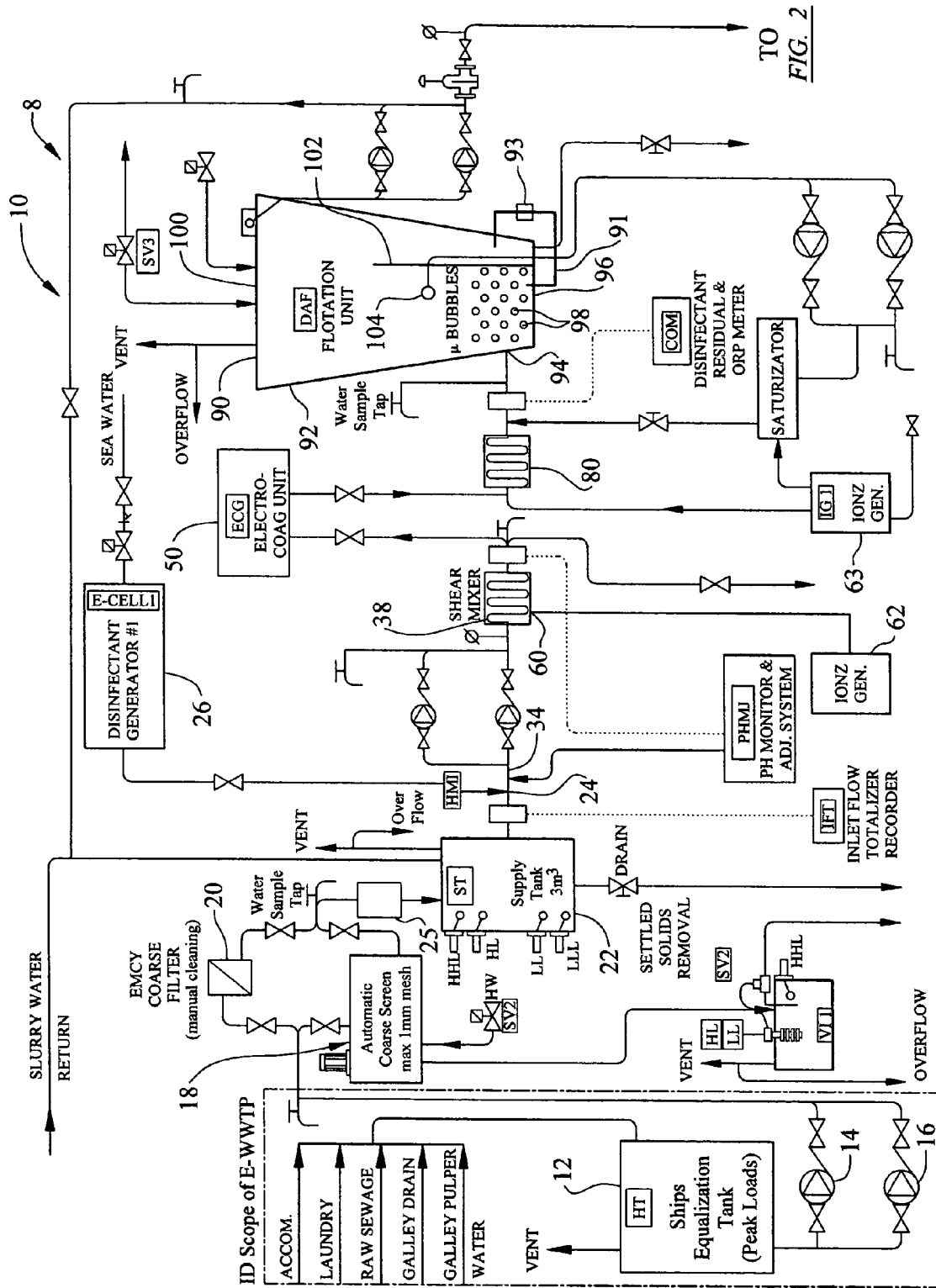
FIG. 1 is a schematic of an embodiment of a primary treatment system of the water treatment system.

FIGS. 1-20 illustrate a water treatment system 10 configured to remove one or more contaminants from a fluid, such as, but not limited to, wastewater. In at least one embodiment, the wastewater treatment system is configured to be used on a vessel, such as a ship, a megayacht, or other vessel producing wastewater. The water may be received from sources, such as, but not limited to, laundries, raw sewage systems, galley drains, galley pulpers, bilge areas, accommodations, such as water from cabin sinks, showers, and other sources. The wastewater treatment system 10 may be capable of removing fecal matter, such as fecal coliform, organisms creating biological oxygen demands (BOD), organisms creating chemical oxygen demands (COD) to produce water close to drinking water standards.

As shown in FIGS. 1-20, the water treatment system 10 may be configured as a modular design such that components of the system 10 may be adapted for each application and may be sized to fit into small compartments commonly found in vessels. The water treatment system may include a primary treatment system 8 and a secondary treatment system 150. The primary treatment system may be configured to remove large suspended solids, and the secondary treatment system may be configured to provide additional disinfection and treatment.

In at least one embodiment, the water treatment system 10 may be configured to discharge decontaminated water out of a vessel, such as, but not limited to, a ship, and into the water in which the vessel floats. Contaminated water may be cleaned by injecting one or more decontaminants, such as, but not limited to, chlorine and bromine into the contaminated water. These decontaminants may be separated from saltwater using electrolysis. The water treatment system 10 may also emit an electrical current into the contaminated water to facilitate precipitation of contaminants from the water. One or more ionized gases may be injected into the contaminated water to facilitate additional disinfection of the wastewater. The components of the wastewater treatment system may be formed from materials that are resistant to corrosion, such as, but not limited to, stainless steel, aluminum, fiberglass, bond strand, and other appropriate materials.

I. Primary Treatment System

The water treatment system 10 may include a collection device 12, which may be an equalization tank, for collecting contaminated water from various sources and to regulate the flow of wastewater into the water treatment system 10. While the size of the collection device 12 depends on the peak loads for a particular vessel in which the water treatment system 10 is mounted, in at least one embodiment, the collection device 12 may have a capacity that is about 25 percent of the daily load for a vessel, which may be about 300 cubic meters ($m^3$). Discharge of contaminated wastewater from the collection device 12 may be controlled using a plurality of valves 14 and 16, which may or may not be remotely controlled using one or more solenoids or other appropriate devices.

Figure 19:
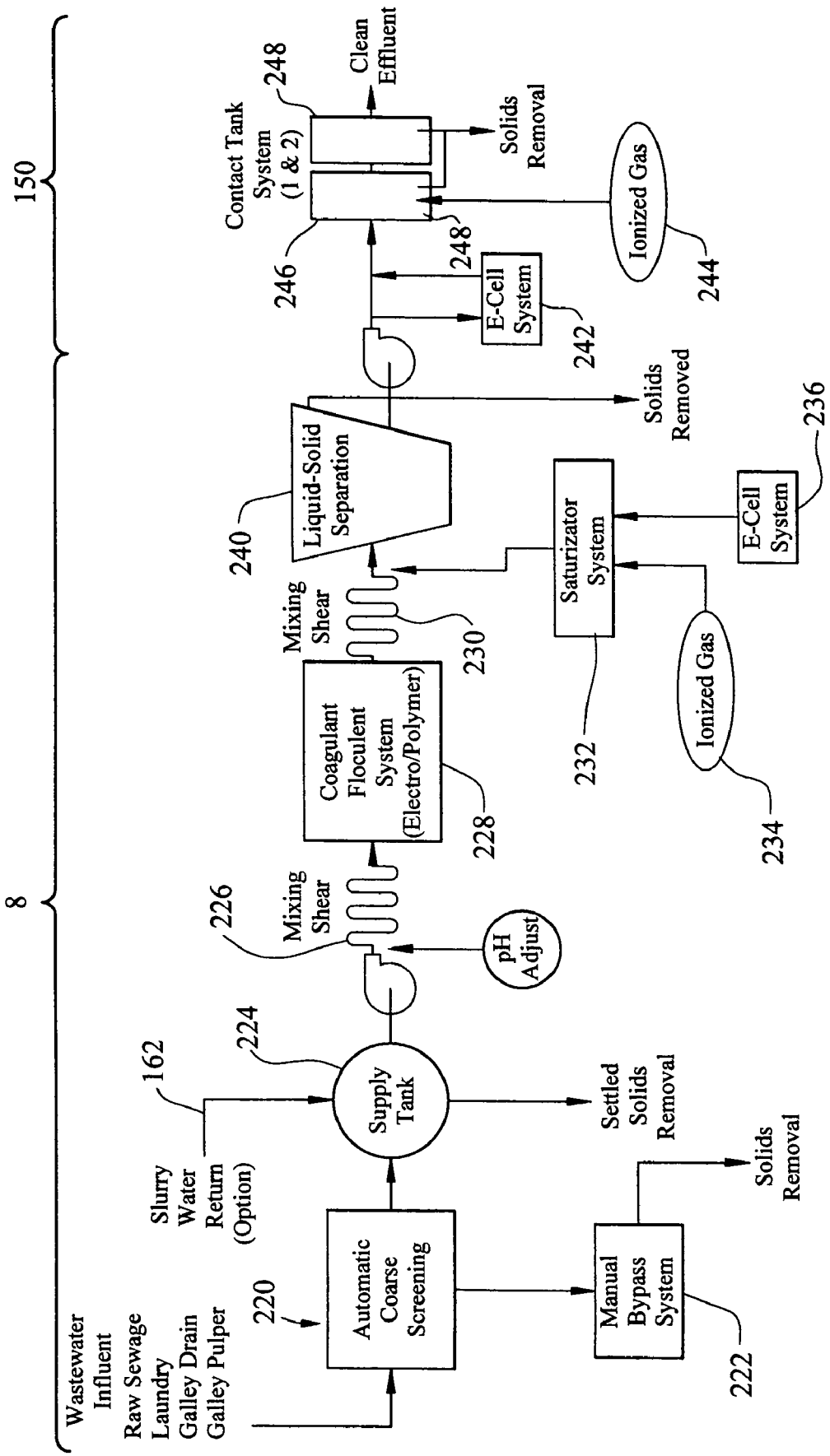
FIG. 19 is a schematic diagram of another embodiment of the primary and secondary treatment systems of the water treatment system.

The collection device 12 may also include a first stage filtration system 18, as shown in FIGS. 1 and 4-6. The first stage filtration system 18 may be positioned downstream of the collection device 12. The first stage filtration system 18 may include one or more coarse screen filters sized to remove solids larger than about two millimeters (mm). However, the filter may have other sizes as well. As shown in FIG. 6, the first stage filter may be formed from one or more coarse filters 21 and one or more fine filters 23. The first stage filtration system 18 may be automatically controlled and include an automatic washing system to facilitate proper operation of the filter. In other embodiments, a manual coarse screen filter 20 may be used as a back up system or as substitution for the automatic coarse screen filter. The first stage filtration system 220, as shown in FIG. 19, may include a manual bypass system 222.

The collection device 12 may also include one or more supply tanks 22 positioned downstream of the first stage filtration system 18 for receiving filtered fluids from the first stage filtration system 18. The supply tank 22 may be sized to receive fluids from the first stage filtration system 18 to regulate the flow of fluids downstream into the other portions of water treatment system 10.

The water treatment system 10 may include one or more disinfectant injectors 24. The disinfectant injector 24 may inject one or more disinfectants into the contaminated fluid flowing through the water treatment system 10. In at least one embodiment, the disinfectant injector 24 may inject one or more disinfectants into the contaminated fluid downstream of the supply tank 22. The disinfectants may include, but are not limited to, disinfectants derived from saltwater, such as sea water, and may include chlorine and bromine. The disinfectants may be stored in a tank or other appropriate device.

In at least one embodiment, as shown in FIG. 1, the water treatment system 10 may include a disinfectant generator 26 usable to generate disinfectants. In this embodiment, a storage tank for the disinfectant is not required, but may be used if desired. Thus, the disadvantages associated with a storage tank filled with disinfectants may be eliminated when using a disinfectant generator. The disinfectant generator 26 may be capable of generating one or more disinfectants from saltwater. The saltwater may be drawn from the water in which a vessel is floating. In at least one embodiment, as shown in FIG. 7, the disinfectant generator 26 may be formed from a housing 28 containing one or more conduits 30 having electrical cells 32 for emitting electricity into the water flowing through the conduits 30. The housing 28 may be generally cylindrical or have another appropriate shape for containing the conduits 30. Likewise, the conduits 30 may be cylindrical or have another appropriate shape. The number of conduits 30 contained in the housing 28 may vary, but in at least one embodiment, housing 28 may contain between four conduits and thirty conduits, and in at least one embodiment, may contain about twenty conduits.

The housing 28 may also include a header 33 for distributing saltwater to the plurality of conduits 30. In addition, the disinfectant generator 26 may also include a bypass conduit 27 for controlling the flow of fluid through the conduits 30. In at least one embodiment, one or more valves 29 may be attached to the conduit 27 for regulating flow of fluids through the disinfectant generator 26. Each conduit 30 of the disinfectant generator 26 may operate efficiently at a flow rate between about 5 gallons per minute (gpm) and about 40 gpm. To keep the disinfectant generator 26 operating at this level, the disinfectant generator may pass excess fluids through the bypass conduit 27. The fluids passing through the bypass conduit 27 and the fluids passing through the conduits 30 mix in the header 31 before flowing to downstream components of the water treatment system 10.

One or more of the conduits 30 may have a valve 35 on an upstream side and a valve 37 on a downstream side of the electrical cell 32 for controlling flow through the electrical cell 32 and enabling replacement of the electrical cell 32 without having to shutdown the entire system during the replacement. One or more of the conduits 30 may have one or more electrical cells 32. The electrical cells 32 may emit an electrical current into the saltwater, which promotes electrolysis. Electrolysis may break the bonds in various compounds and produce free halides, such as but not limited to, chlorine and bromine, in liquid form. The reduction potential for saltwater electrolysis may be as follows:

| (1) | Electrolysis of Water | |
| | $O_2 + 4H^+ + 4e^- \rightarrow 2H_2O$ | 1.229 V; |
| (2) | Potential Halide Reactions | |
| | $Cl_2 + 2e^- \rightarrow 2Cl^-$ | 1.358 V; |
| | $Br_2 + 2e^- \rightarrow 2Br^-$ | 1.065 V; |

The disinfectant generator 26 may be capable of producing halides, such as chlorine, in a concentration of between about 0.5 parts per million (ppm) and about 20 ppm. The desired amount of disinfectant produced is a concentration large enough to remove biota and other contaminants from the water and have residual concentrations of the chlorine or bromine left over.

The disinfectants may be collected and sent to a conduit 34 carrying contaminated fluids. Byproducts produced by this process may be returned to the sea or other body of water, or other source. The components of the disinfectant generator 26 may be formed from materials, such as, but not limited to, stainless steel, such as stainless steel 316L schedule 40 fiberglass or bond strand. One or more of the conduits 30 may include one or more sensors 36 for measuring salinity, pressure, temperature, and other system parameter. Sensor 36 is depicted as a tube in FIG. 7; however, sensor 36 is not limited to this configuration. The disinfectant generator 26 may also include a water leak detector, which may send an alert signal in the event of internal piping failure to prevent catastrophic results. A petcock (not shown) may also be included in the housing 28 for manual viewing of the internal aspects of the disinfectant generator 26. Gas may be injected under pressure or drawn in under low pressure created behind the deflector 44 via the Venturri effect.

One or more mixers 38, as shown in FIGS. 1 and 10-12, may be positioned downstream of the location at which the disinfectant injector 24 is coupled to the conduit 34. In at least one embodiment, the mixer 38 may be formed from an elongated housing 40 containing a plurality of injectors 42. The injectors 42 may be positioned around the perimeter of the housing 40 and offset relative to each other so as to form a helical formation. In at least one embodiment, the injectors 42 may be positioned in other configurations about the housing 40. The injectors 42 may be offset about 76 millimeters and rotated about 45 degrees relative to each adjacent injector 42.

Figure 10:
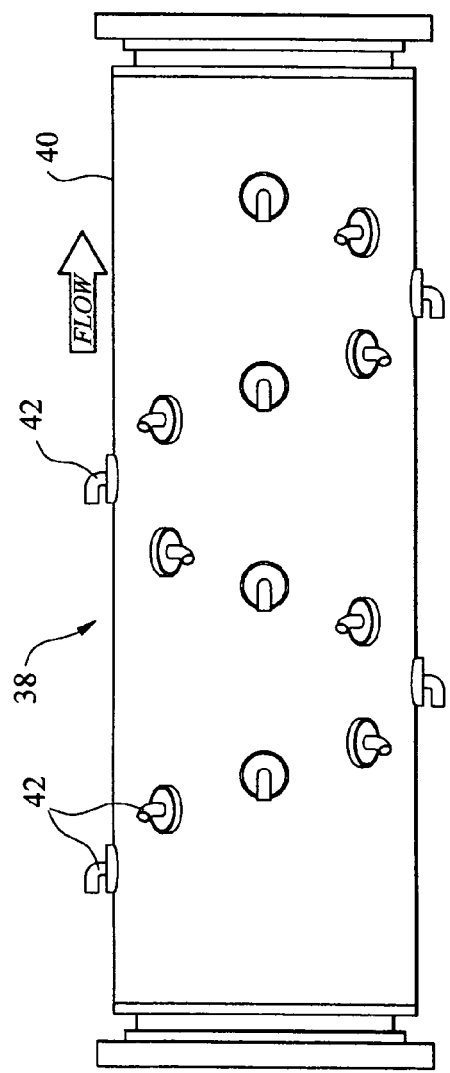
FIG. 10 is a side view of a mixer usable in the water treatment system.
Figure 12:
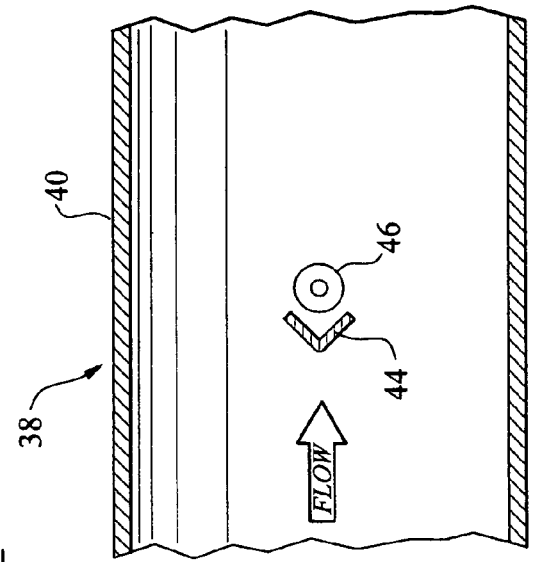
FIG. 12 is a cross-sectional top view of a portion of the mixer of FIG. 11 taken along line 12-12.
Figure 11:
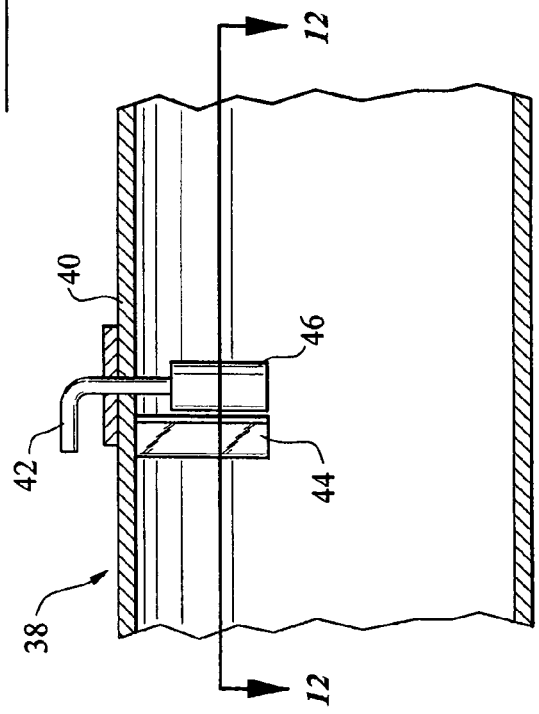
FIG. 11 is a cross-sectional side view of a portion of the mixer of FIG. 10.

In at least one embodiment, as shown in FIGS. 11 and 12, the injectors may include a deflector 44 extending from the housing 40 into inner aspects of the mixer 38. In at least one embodiment, the deflector 44 may be formed from a V-shaped member. The injector 42 may also include a diffuser 46, which may be, but is not limited to, a stone, for diffusing a gas into a fluid contained in the mixer 38. The diffuser 46 may be adapted to emit a gas, such as an ionized gas. The ionized gas may be received from an ionized gas generator 60 or another source. The mixer 38 may include gaskets and bolt sleeves in appropriate locations to establish galvanic isolation between dissimilar metals to enhance the life of the mixer 38. In at least one embodiment, as shown in FIG. 10, the mixer 38 may be generally cylindrical; however, in other embodiments, the mixer 38 may have other appropriate shapes.

The water treatment system 10 may include one or more ionized gas injectors 60 for injecting ionized gas into fluids flowing through the water treatment system 10, and more particularly, for injecting ionized gas into the mixer 38 through the injectors 42. The ionized gas injector 60 may be adapted to inject ionized gases, such as, but not limited to, nitrogen and oxygen, into the mixer 38.

Figure 15:
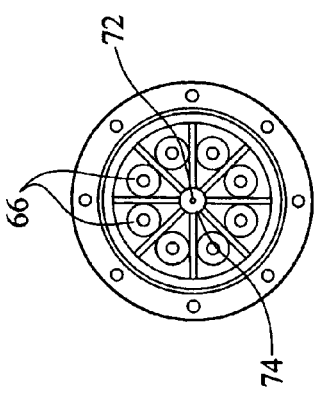
FIG. 15 is a cross-sectional end view of the ionized gas generator shown in FIG. 14.

As shown in FIGS. 14-18, the ionized gas generator 62 may be formed from a plurality of chambers 64 containing one or more ultraviolet (UV) lamps 66. The ionized gas generator 62 may include between one lamp and about 20 lamps, with at least one embodiment having about eight lamps as shown in FIG. 15. In at least one embodiment, the ultraviolet lamps may have a wavelength between about 185 nm and about 255 nm. The chambers 64 may be, but are not limited to, generally cylindrical tubes sized and adapted to contain a plurality of UV lamps. The UV lamps may extend from a first end 68 of the chamber 64 to a second end 70 of the chamber 64, which is generally opposite to the first end 68.

Figure 16:
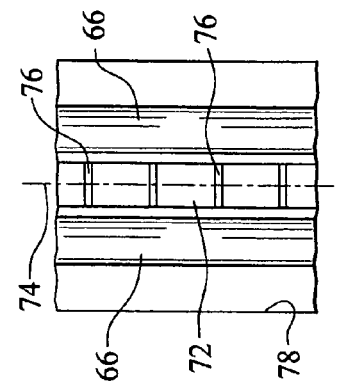
FIG. 16 is a cross-sectional side view of the ionized gas generator taken at 16-16 in FIG. 14.

The ionized gas generator 62 may also have a plurality of magnets 72 positioned in the chambers 64. In at least one embodiment, the magnets 72 may be, but are not limited to, permanent magnets, such as rare earth magnets. The magnets 72 may be positioned, as shown in FIG. 16, generally along a longitudinal axis 74 of a chamber 64. Each chamber 64 may include a plurality of magnets 72 stacked on top of each other using spacers 76 and oriented so that ends of adjacent magnets 72 have like polarity. Orientation of the magnets in this manner increases the width of the magnetic field produced by the magnets 72. In at least one embodiment, the width of the magnetic field may be at least as large as the distance between the magnets 72 and an inside surface 78 of the chamber 64. Passing air through the magnetic fields produced by the magnets and exposing the air to ultraviolet light reduces nitrogen and oxygen in the air and produces free oxygen and nitrogen.

Figures 17, 18:
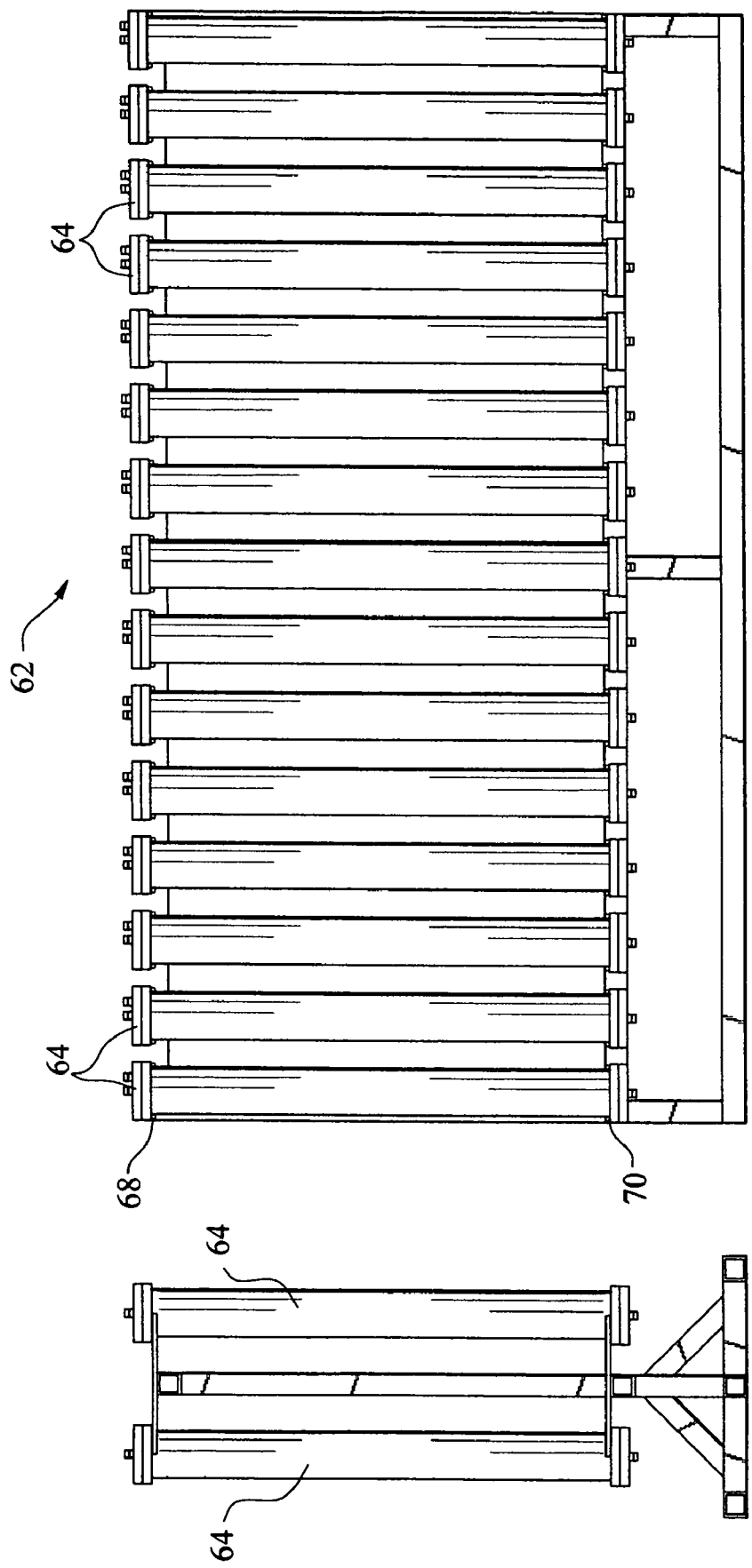
FIG. 17 is a side view of a collection of chambers forming an ionized gas generator.
FIG. 18 is a front view of the collection of chambers forming an ionized gas generator shown in FIG. 17.

The number of chambers 64 used in a particular application depends on the circumference and length of the chambers 64 and the anticipated fluid flow through the water treatment system 10. In at least one embodiment, as shown in FIG. 16, the chambers 64 may have diameters that are about 15 centimeters and may be about 60 inches in length. In this embodiment, as shown in FIG. 18, the ionized gas generator 62 may include between about one chamber and about 90 chambers 64; however, the ionized gas generator 62 is not limited to being formed from this number of chambers. Rather, the ionized gas generator 62 may be formed from other amounts of chambers 64. In at least one embodiment, the chambers 64 may be coupled together in parallel. Air flowing through the chamber 64 cools the ultraviolet lamps 66 while being ionized. In at least one embodiment, the air flow rate may be between about two cubic feet per minute (cfm) and about six cfm, depending on the circumference and length of the chambers 64. In one embodiment, the ionized gas generator 62 may have a flow rate of air through the generator 62 of about 2.5 cfm.

The reduction potential for ionized gas according to the present invention is as follows:

| Oxidizing Gas Species | |
|---|---|
| $O_3 + 2H^+ + 2e^- \rightarrow O_2 + H_2O$ | 2.07 V; |
| $H_2O_2 + 2H^+ + 2e^- \rightarrow 2H_2O$ | 1.32 V; |

The ionized gas provides both a biological influence and an electromagnetic influence on the water containing the electrolytically produced disinfectants and enhances the coagulation of the contaminants, the separation of solid particles, and the removal of contaminants.

Figure 13:
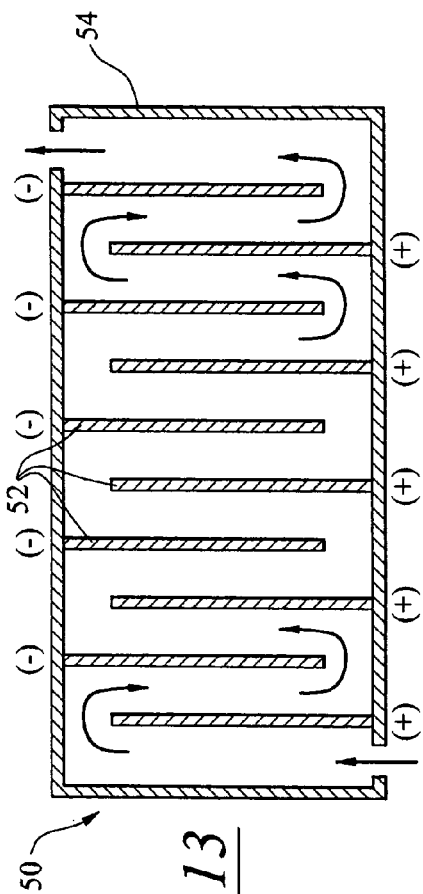
FIG. 13 is a schematic view of an electrical coagulation unit usable in the water treatment system.
Figure 14:
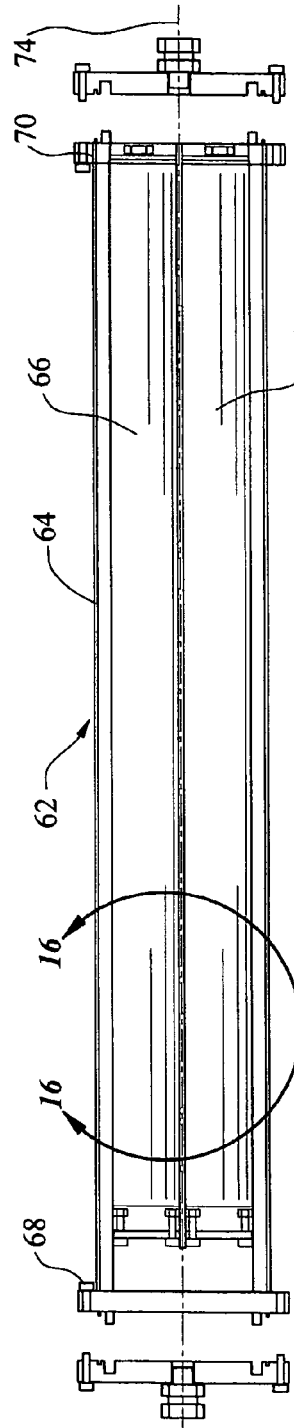
FIG. 14 is a cross-sectional side view of an ionized gas generator usable in the water treatment system.

The water treatment system 10 may include one or more electrical coagulation units 50 downstream of the mixer 38 and the ionized gas generator 62. The electrical coagulation unit 50 may be capable of applying an electrical current to wastewater passing through the unit 50. In at least one embodiment, as shown in FIG. 13, the electrical coagulation unit 50 may be a generally metallic cell capable of imparting a direct current (DC) into the wastewater passing through the electrical coagulation unit 50. The electrical coagulation unit 50 may be formed from a plurality of plates 52 positioned generally parallel within a housing 54. The electrical coagulation unit 50 may be configured in at least one embodiment so that the wastewater flowing through the unit 50 flows along a serpentine pathway between each plate 52, as shown in FIG. 13. The plates may be arranged in an alternating fashion such that negatively charged plates 52 are positioned on either side of a positively charged plate 52. The plates 52 may be formed of materials, such as, but not limited to, aluminum, iron, stainless steel, titanium and other composite materials.

The DC may saturate a wastewater stream flowing through the electrical coagulation unit 50 with electricity to provide an electromotive force necessary to facilitate chemical reactions. In at least one embodiment, the DC may have a relatively low voltage, such as, but not limited to, between about 1 volt and about 50 volts. The electricity introduces the electrons necessary to complete the valence shells of the elements, which, in turn, form more stable compounds. The stable compounds are generally difficult to dissolve in water and generally precipitate out of solution. In addition, application of the electricity causes electrolysis to occur. Electrolysis produces disinfectants, such as hypochlorite and halides such as, but not limited to, bromine and chlorine, from saltwater in the wastewater. These disinfectants kill bacteria, viruses, and other living biological materials in the wastewater. If the wastewater does not have a sufficient concentration of salt, salt may be added in amounts such as between about 2,000 ppm and about 5,000 ppm to facilitate electrolysis. At times, seawater may be used having between about 30 and 35,000 ppm of salt.

The electrical coagulation unit 50 facilitates coagulation through electrical reactions with dissolved impurities. In operation, the electrical current introduced to the plates 52 cause sacrificial electrode ions to remove contaminants by chemical reaction, precipitation, or through coalescence of colloidal materials, or any combination thereof. In addition, the introduction of electricity to the wastewater may break oil emulsions in the fluid. Portions of the aluminum plates 52 may break off of the plates 52 and form flocculants in the fluid passing through the electrical coagulation unit 50. The electrical coagulation unit 50 may operate at a steady state by controlling the current and voltage of the electrical current applied to the plates 52. In an alternative embodiment, the water treatment system 10 may use a polymer injection unit in place of the electrical coagulation unit 50 for removing suspended solids.

The water treatment system 10 may also include one or more second mixers 80 downstream of the electrical coagulation unit 50. The second mixer 80 may be positioned to mix the one or more ionized gases generated by the ionized gas generator 63 or injected by the ionized gas injector 60 with wastewater passing through the water treatment system 10. The second mixer 80 may be similar to the mixer 38. However, in at least some embodiments the configuration or size, or both, of the second mixer 80 may differ from the mixer 38.

The water treatment system 10 may also include one or more dissolved air flotation units 90 for removing contaminants from the water using microbubbles. In at least one embodiment, the dissolved air flotation unit 90 may be positioned downstream of the second mixer 80. The dissolved air flotation unit 90 may be formed from a tank 92 having an inlet 94 near a bottom surface 96 of the tank 92. Injectors 98 may be positioned in the bottom surface 96 or proximate to the bottom surface 96 for injecting bubbles into the tank 92 at the bottom portion of the tank 92. During operation, bubbles may carry solids to the top 100 of the tank 92 where the solids flow over the top of one or more weirs 102. In alternative embodiments, suspended solids may be taken off of the surface using one or more vacuums. In at least one embodiment, ionized gases may be injected as microbubbles into the tank 92. The relatively clean water may be expelled from the dissolved air flotation unit 90 through one or more exit orifices 104 positioned generally midway between the bottom 96 and the top 100 of the tank 92. Cleaned water may also be withdrawn from the dissolved air flotation unit 90 and injected into the injectors 98 of the dissolved air flotation unit 90 via a recirculation loop 91. In at least one embodiment, one or more electrical coagulation units 93 may be attached to the recirculation loop 91. In at least one embodiment, the dissolved air flotation unit 90 may have a capacity between about 300 gallons and about 500 gallons and capable of processing about 100 tons of wastewater per day.

An alternative embodiment of the primary treatment system 8, as shown in FIG. 19, may include substantially all of the components previously described but in an alternative configuration. More specifically, the primary treatment system 8 may include a first stage filtration system 220 positioned upstream from the supply tank 224. The first stage filtration system may also include a manual bypass system 222. A mixer 226 may be positioned downstream of the supply tank 224. The pH of the wastewater flowing through the primary treatment system 8 may be controlled at the mixer 226. A flocculant system 228 may be positioned downstream of the mixer 226. In at least one embodiment, the flocculant system 228 may be an electrical coagulation unit 50, as previously described and shown in FIG. 13. The primary treatment system may include a second mixer 230 positioned downstream of the flocculant system 228.

The primary treatment system 8 may also include a saturator system 232 for mixing ionized gases or disinfectants, or both, with a wastewater. In at least one embodiment, the saturator 232 may be formed from a chamber and may receive ionized gas or may receive disinfectants, or both. The saturator 232 is a pressure vessel operating between about 3 bars and about 6 bars in which one or more gases may be dissolved into a fluid forming a supersaturated fluid. In at least one embodiment, the saturator 232 may receive ionized gases from an ionized gas generator 234, as shown in FIGS. 14-18 and identified therein as ionized gas generator 62. The saturator 232 may receive disinfectants, such as, but not limited to chlorine, bromine, and other disinfectants, from a disinfectant generator 236, as shown in FIGS. 7-9 and identified therein as disinfectant generator 26. The gases dissolved into water, or other fluid, in the saturator 232 are released when the dissolved gas/fluid mixture is released into atmospheric conditions.

The primary treatment system 8 may also include one or more dissolved air flotation units 240 downstream of a connection point of the saturator 232. The dissolved air flotation unit 240 may inject microbubbles into the stream of wastewater to remove suspended solids. In at least one embodiment, ionized gases may be injected into the wastewater stream.

Figure 20:
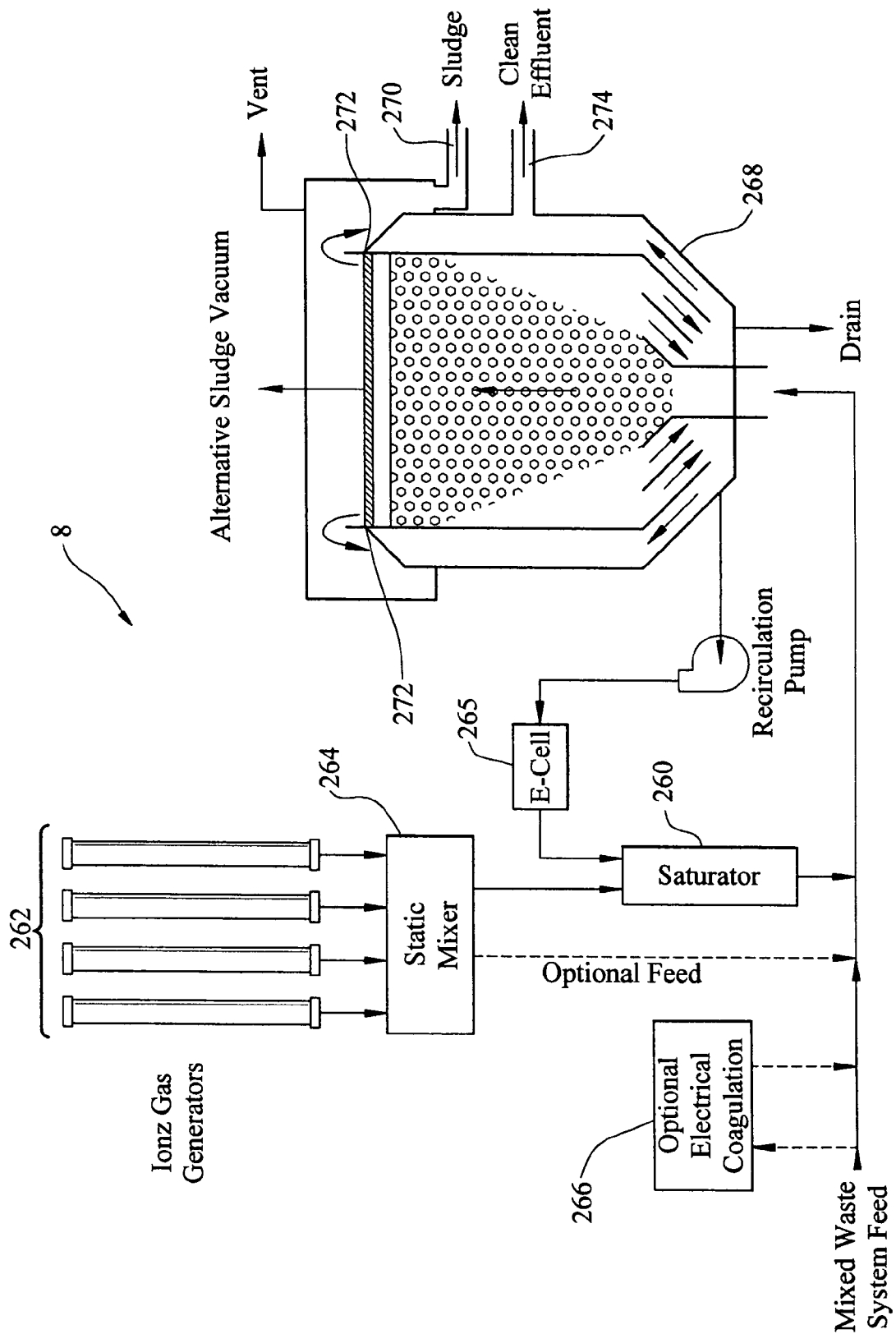
FIG. 20 is a schematic diagram of yet another embodiment of the primary treatment system of the water treatment system.

Another alternative embodiment of the primary treatment system 8, as shown in FIG. 20, includes a saturator system 260. The saturator system 260 may be feed with one or more ionized gases or disinfectants, or both. In at least one embodiment, one or more ionized gas generators 262 may be coupled to at least one mixer 264. The mixer 264 may or may not resemble the mixer shown in FIGS. 10-12. The mixer 264 may be in communication with the saturator 260 and upstream of the saturator 260. A disinfectant source 265, which may be a tank, a disinfectant generator, as shown in FIGS. 7-9, or other device, may also be coupled to the saturator 260. In at least one embodiment, a flocculent source 266 may be included in the primary treatment system 8. The flocculent source 266 may be, but is not limited to being, an electrical coagulation unit, as shown in FIG. 13.

A dissolved air flotation unit 268, may be positioned downstream of the saturator 260. The dissolved air flotation unit 268 may be formed from various configurations. In at least one embodiment, as shown in FIG. 20, the wastewater may enter the dissolved air flotation unit 268 at a bottom portion of the unit 268. Microbubbles consisting of air, ionized gases, or other gases, may be injected into the wastewater in the dissolved air flotation unit 268. Suspended solids may attach to the microbubbles and be carried to a surface of the wastewater. The solids may be separated from the wastewater using a vacuum system or by allowing the solids to flow over a weir 272 and out outlet 270. Cleaned wastewater may be removed from a bottom portion of the dissolved air floatation unit 268 through outlet 274. The cleaned wastewater may or may not be sent through a secondary treatment system.

The primary treatment system 8 may be configured to treat wastewaters containing large concentrations of oils, such as oil concentrations commonly found in bilge water. In particular, the primary treatment system 8 may include one or more gross oil/water separators 25, as shown in FIG. 1, for removing a substantial portion of one or more oils from the wastewater before the wastewater has an opportunity to contact other components of the wastewater treatment system 10.

II. Secondary Treatment System

The secondary treatment system 150, as shown in FIG. 19, may include one or more disinfectant injectors 150 for applying disinfectants to wastewater flowing through the secondary treatment system 150. The disinfectant injector 150 may be positioned downstream of the primary treatment system 8, and, in at least one embodiment, may be positioned immediately downstream of the dissolved air flotation units 90. The disinfectant injector 152 may include a disinfectant generator 154 for generating disinfectants to inject into the wastewater flowing through the secondary treatment system 150.

The secondary treatment system 150 may include a contact tank 156 for mixing one or more disinfectants and the wastewater. The contact tank 156 may have a capacity of between about 5 gallons and about 100 gallons.

The secondary treatment system 150 may also include one or more filters 160 for removing suspended solids and other contaminants that may not have been previously removed in the water treatment system 10. The filter 160 may be a filter, such as, but not limited to, a 35 micron filter. The filter 160 is not limited to this size but may be other sizes as well. The filters may include media such as, but not limited to, sand, glass beads, carbon, ion resins, or other appropriate materials. In at least one embodiment, the filter 160 may be formed from two filters 160 in parallel, which may be referred to a duplex filter mechanism. The duplex filter mechanism enables either or both of the filters 160 to be used. In the event one of the filters 160 needs to be cleaned, valves may be actuated to isolate one of the filters 160 to be cleaned or replaced.

Figure 2:
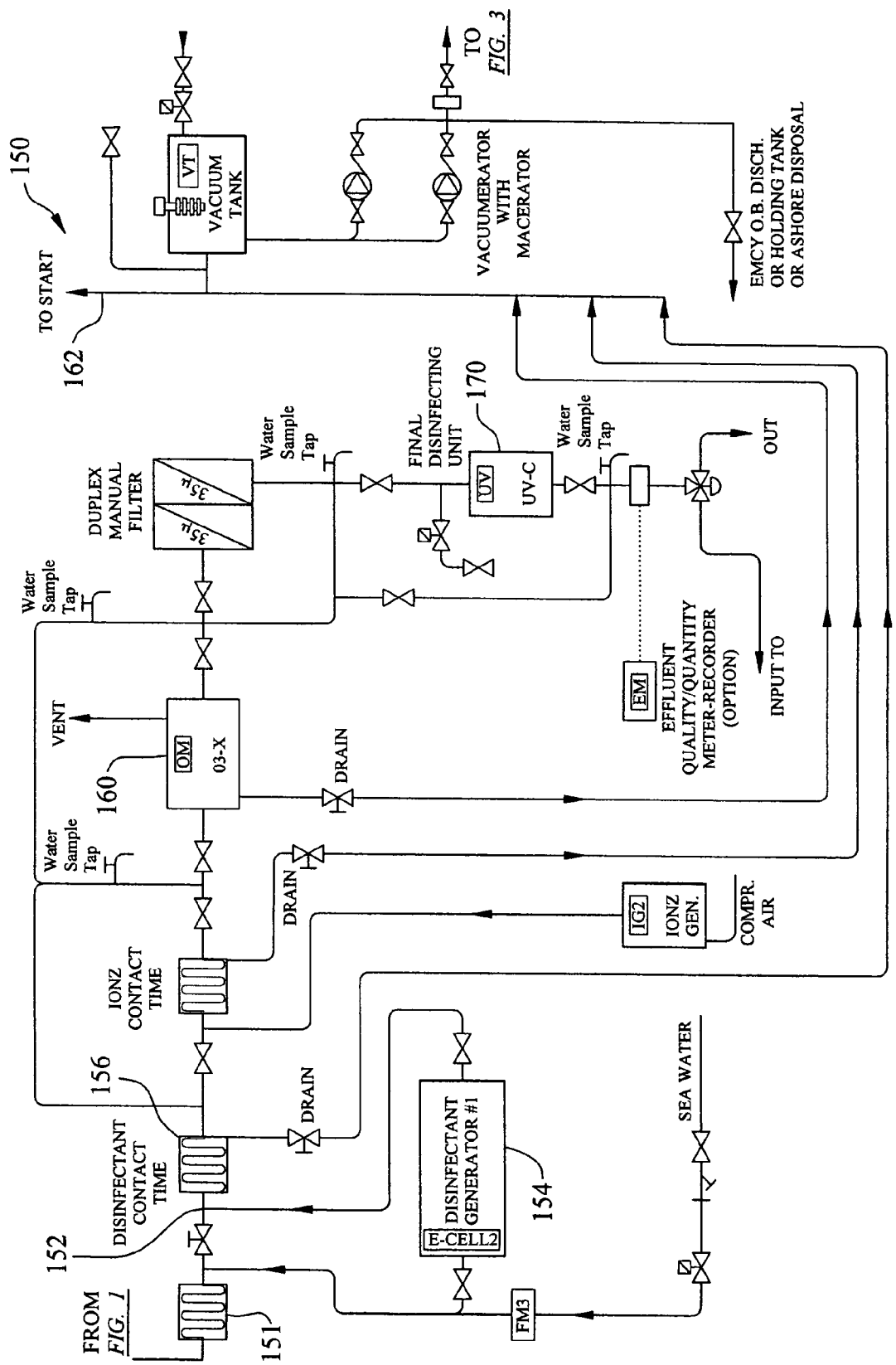
FIG. 2 is a schematic of an embodiment of a secondary treatment system of the water treatment system.
Figure 3:
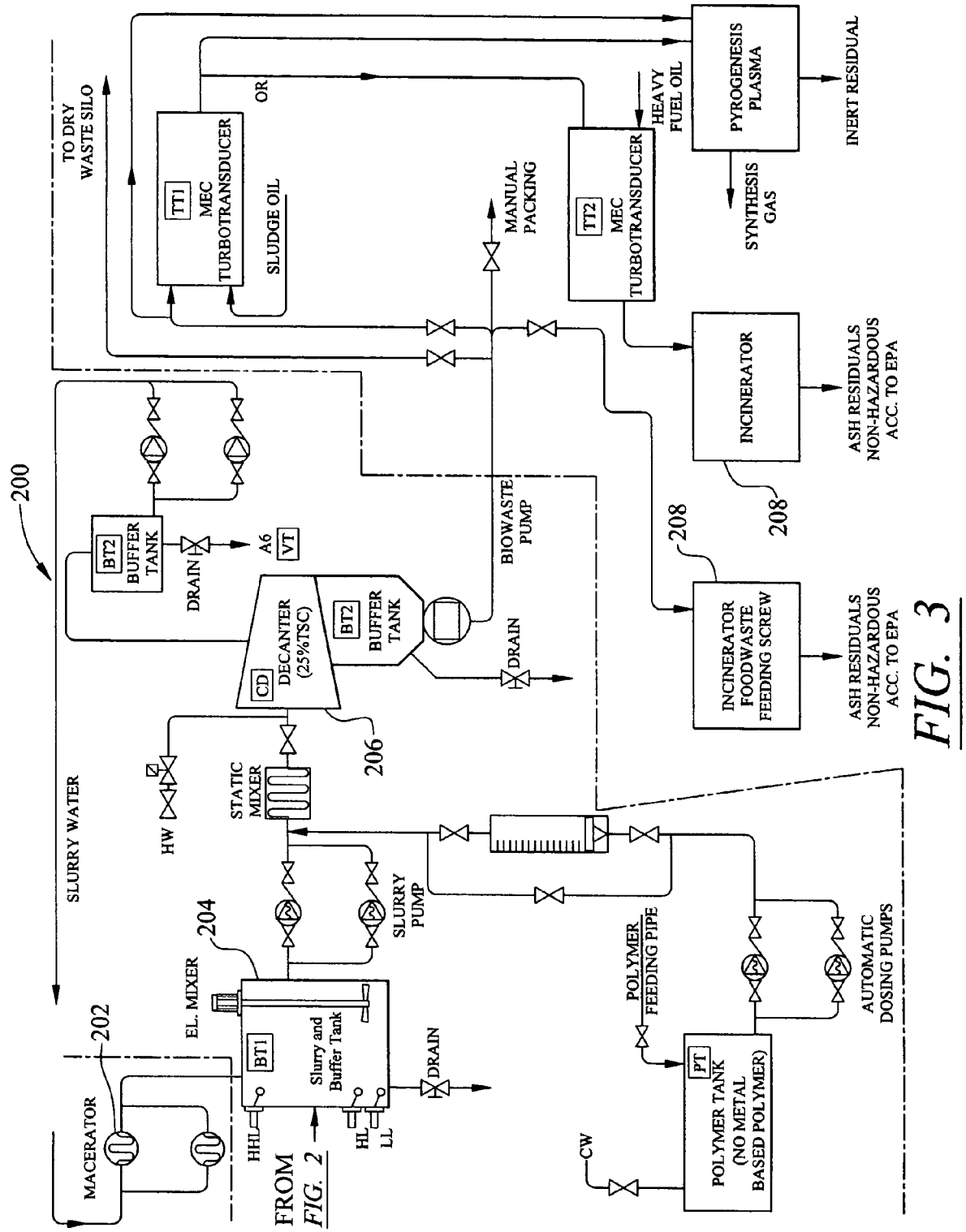
FIG. 3 is a schematic of an embodiment of a solids treatment system of the solid waste treatment system.

The secondary treatment system 150 may also include a disinfectant light source 170. In at least one embodiment, the disinfectant light source 150 may be one or more ultraviolet lamps. The secondary treatment system 150 may also include a recirculation loop 162, as shown in FIG. 2 and 19, for directing wastewater having one or more contaminants above a selected standard to the beginning of the water treatment system 10 to be sent through the system 10 once again. The standards selected may be those standards of the jurisdiction in which a vessel containing the water treatment system 10 is present. In at least one embodiment, those standards may be the standards in force in Miami, Dade County, Fla., U.S.A.

In an alternative embodiment, the secondary treatment system 150 may be configured to inject one or more disinfectants or one or more ionized gases, or both, into a stream of wastewater flowing from the dissolved air flotation unit 240, as shown in FIG. 19. The disinfectants may be supplied from one or more disinfectant generators 242, and the ionized gases may be supplied from one or more ionized gas generators 244. The ionized gas may be injected into the wastewater in one or more contact tanks 246. At least one of the contact tanks 246 may be used to remove solids from the wastewater. In at least one embodiment, the secondary treatment system 150 may include two contacts tanks 246. Some embodiments of the secondary treatment system 150 may also include an electrical coagulation unit 151, as shown in FIG. 2, for coagulating contaminants in the wastewater.

III. Solid Waste Treatment System

The water treatment system 10 may also include a solid waste treatment system 200 for collecting sludge separated by the primary or secondary treatment systems 8, 150. The sludge may be transported to the solid waste treatment system 200 using one or more pumps 202, which may be, but is not limited to, a macerating pump. The solid waste treatment system 200 may include a buffer tank 204 for collecting the sludge from the pump 202. Polymers may be added to the sludge while contained in the buffer tank 204. The solid waste treatment system 200 may also include a separator 206, which may be, but is not limited to, a centrifugal separator 206. Sludge received from the separator 206 may have a solids concentration of about 25 percent. The sludge may be sent to a garbage silo to be mixed with other combustible wastes. This mixture of garbage may be dried by sending the mixture through a dryer prior to being sent through an incinerator 208. The sludge may be sprayed directly into an incinerator 208 using one or more nozzles. Water received from the separator may be recirculated to the beginning of the water treatment system 10 for further treatment.

IV. Operation of Wastewater Treatment System

Operation of the wastewater treatment system 10 may be controlled using various controllers to automatically control and operate the various components of the wastewater treatment system described above. The controllers for the wastewater treatment system 10 may be completely contained on the vessel in which the wastewater treatment system 10 is mounted. In other embodiments, some or all of the controllers may be located on another vessel or on land. Thus, the wastewater treatment system 10 may be controlled by personnel not on the vessel in which the wastewater treatment system 10 is mounted. A configuration such as this prevents crew members from overriding the system 10 and discharging wastewater having concentrations of contaminants that are greater than applicable regulations. Thus, remote control of the system 10 may prevent an owner of a vessel from liability from illegal discharges.

The wastewater treatment system 10 may be configured from a plurality of modules sized to accommodate an anticipated maximum load from a supply source, such as sources commonly found on a vessel, such as a ship, a megayacht, or other vessel. The wastewater treatment system 10 may receive fluids from a variety of sources on a vessel, some of which are previously listed, such as, but not limited to, laundry facilities, raw sewage, galley drain, galley pulper, bilge areas, and other sources. The water treatment system may utilize one or more of the following: nitrogen, oxygen, bromine, chlorine, and hydrogen peroxide, to disinfect the wastewater. Thus, the wastewater treatment system 10 may treat wastewater without injecting the wastewater with significant amounts of chemicals that are harmful to the environment.

The wastewater is collected in the collection device 12, which is used to regulate the flow of fluids through the system 10. The wastewater flows from the collection device 12 through a filtration system 18 where large suspended solids are removed. In embodiments configured to cleanse wastewater with high concentrations of oils, such as bilge water, the wastewater may be passed through one or more gross oil/water separators 25 to remove at least a portion of the oils from the wastewater. The wastewater may then be passed to a supply tank 22, which also regulates the flow of fluids through the water treatment system 10. Waste waster flows from the supply tank 22 towards the mixer 38; however, before the wastewater is passed into the mixer 38, a disinfectant may be added into the wastewater through the disinfectant injector 24. The disinfectant may be taken from a storage tank or other holding source or may be produced using a disinfectant generator 26. In at least one embodiment, the disinfectant may be a halide taken from sea water and may include, but is not limited to, chlorine or bromine, or both.

The disinfectant may mix with the wastewater in the conduit 34 and may remove at least a portion of the fecal coliforms, BOD, or COD, or any combination thereof, from the wastewater. The mixture of the disinfectant and the wastewater may be passed to a mixer 38 to be mixed with one or more ionized gases. The ionized gas may be emitted into the wastewater stream by passing through an ionized gas injector 60. In at least one embodiment, the ionized gas may be generated by the ionized gas generator 62. The ionized gas may remove numerous contaminants from the wastewater.

The wastewater is then passed to an electrical coagulation unit 50, which emits electricity into the stream of wastewater. In at least one embodiment, the electrical coagulation unit 50 may be formed from a plurality of electrically conductive plates 52 that electrolyze and form flocculants in the wastewater. The flocculants facilitate removal of suspended solids, fecal coliforms, BODs, CODs, or other materials, or any combination of these materials. The waste materials settle out of solution and collect in the electrical coagulation unit 50, where the waste materials may be removed.

The wastewater may then be passed to a mixer 80 where the wastewater may be mixed with an ionized gas. The ionized gas may be generated in the ionized gas generator 63. The ionized gas removes at least a portion of the contaminants from the wastewater that has not been previously removed. The wastewater may then be passed to a dissolved air flotation unit 90 in which the suspended solids and other materials may precipitate out of the wastewater and the partially clean water may be removed from the unit 90. Microbubbles formed from air, ionized gases, or other gases, or any combination thereof, are passed through the dissolved air flotation unit 90 to separate suspended solids from the wastewater.

The partially clean water may then be passed to a secondary treatment system 150. In the secondary treatment system 150, a disinfectant may be added to the wastewater to further kill at least a portion of any remaining fecal coliforms, BODs, CODs, or any other organic materials. The disinfectant may be produced using a disinfectant generator 154 to generate disinfectants from sea water or taken from a storage tank in some embodiments. The wastewater may then be passed through a contact tank or pipe 156, which regulates the amount of time the disinfectant is in contact with the wastewater. The wastewater may then be passed to a filter 160 for removing any remaining suspended solids and other contaminants from the wastewater. In at least one embodiment, the filter 160 may be formed from two or more filters configured to enable removal and replacement of at least one of the filters 160 while the other filter remains operable, thereby reducing, or eliminating, downtime of the system 10. The cleaned wastewater may be tested to determine if the wastewater meets applicable standards. If the wastewater does not meet the standards, the wastewater may be sent back through the system by passing the wastewater through the recirculation loop 162 to be cleaned by the system once again. This process may be completed as many times as necessary, although it is possible that a single pass is sufficient.

Solids, such as sludge, recovered from the wastewater at various stages in the system 10 may be handled in the solid waste treatment system 200. The solids may be transported using the pump 202. The solids may be stored in the buffer tank 204 and sent to the separator 206 to remove additional water from the solids. Any water recovered from the system 10 may be sent to the beginning of the system 10 to be processed. Solid material in a dewatered form may be removed from the separator 206 and burned in the incinerator 208, thereby substantially reducing the amount of waste requiring storage.

The terms and expressions which have been employed herein are used as terms of description and not of limitation, and there is no intention, in the use of such terms and expressions, of excluding any equivalents of the features shown and described or portions thereof. Furthermore, the descriptions of this invention are directed to embodiments configured for use on ocean going ships and vessels; however, the invention may also be utilized in land based applications as well. Having thus described the invention in detail, it should be apparent that various modifications can be made in the present invention without departing from the spirit and scope of the following claims.

We claim:

1. A water treatment system, comprising:
   at least one collection device for collecting wastewater containing contaminants;
   at least one disinfectant injector for injecting at least one disinfectant into the wastewater treatment system downstream of the at least one collection device;
   at least one mixer for mixing an ionized gas with the wastewater, fluidly connected to and disposed downstream of the at least one disinfectant injector;
   at least one ionized gas injector coupled to the at least one mixer for injecting ionized gas into the wastewater in the at least one mixer; and
   at least one dissolved air flotation unit for removing suspended solids from the wastewater using microbubbles, fluidly connected to and disposed downstream of the ionized gas mixer.

2. The water treatment system of claim 1, wherein the at least one disinfectant injector further comprises a disinfectant generator for generating disinfectant materials from saltwater.

3. The water treatment system of claim 2, wherein the disinfectant generator comprises a housing containing a plurality of conduits having electrical cells for exposing electricity to saltwater flowing through the conduits.

4. The water treatment system of claim 3, wherein the disinfectant generator further comprises a single inlet coupled to a header that distributes saltwater to the plurality of conduits and at least one of the conduits has a valve upstream of an electrical cell and a valve downstream of the electrical cell.

5. The water treatment system of claim 3, wherein the disinfectant generator further comprises at least one sensor positioned downstream of an electrical cell in at least one of the plurality of conduits.

6. The water treatment system of claim 3, wherein the disinfectant generator further comprises at least one bypass conduit for controlling flow of saltwater through the conduits of the disinfectant generator.

7. The water treatment system of claim 3, wherein the disinfectant generator comprises between about four conduits and about twenty conduits, each having an electrical cell.

8. The water treatment system of claim 1, wherein the ionized gas injector comprises an ionized gas generator formed from a plurality of chambers, each chamber containing a plurality of ultraviolet lamps and each chamber adapted to allow a gas to pass through the ionized gas generator.

9. The water treatment system of claim 8, wherein the plurality of ultraviolet lamps comprise between about one ultraviolet lamp and about twenty ultraviolet lamps extending from a first end of the ionized gas generator to a second end of the generator generally opposite to the first end.

10. The water treatment system of claim 9, wherein the plurality of chambers are coupled in parallel.

11. The water treatment system of claim 9, wherein the plurality of chambers forming the ionized gas generator comprises thirty chambers.

12. The water treatment system of claim 1, wherein the dissolved air flotation unit comprises a tank comprising: an inlet positioned proximate to a bottom surface of the tank; a plurality of injectors proximate to the bottom surface of the tank for emitting ionized gas microbubbles; and at least one contaminant removal device for separating suspended solids carried to the top of the unit by the ionized gas microbubbles from the wastewater.

13. The water treatment system of claim 1, further comprising at least one filtration system upstream of the collection device for removing at least a portion of the suspended solids from the wastewater.

14. The water treatment system of claim 13, wherein the at least one filtration system comprises at least one drum screen with an automatic cleansing system.

15. The water treatment system of claim 1, further comprising at least one electrical coagulation unit for applying an electrical current to the wastewater for removing at least a portion of the suspended solids.

16. The water treatment system of claim 15, wherein the electrical coagulation unit comprises a plurality of plates positioned generally parallel to each other and including a generally serpentine flow path between the plurality of plates.

17. The water treatment system of claim 15, wherein the at least one disinfectant injector comprises at least one first disinfectant injector positioned upstream of the electrical coagulation unit and at least one second disinfectant injector positioned downstream of the at least one dissolved air flotation unit.

18. The water treatment system of claim 17, wherein the first and second disinfectant injectors positioned upstream and downstream of the electrical coagulation unit each further comprise at least one disinfectant generator for generating disinfectant materials from saltwater, each comprising a housing containing a plurality of conduits having electrical cells for exposing electricity to the water flowing through the conduits.

19. The water treatment system of claim 17, further comprising at least one contact tank downstream of the second disinfectant injector.

20. The water treatment system of claim 1, further comprising at least one ionized gas injector downstream of the at least one dissolved air flotation unit for injecting ionized gas into the water treatment system.

21. The water treatment system of claim 20, further comprising at least one contact tank downstream of the ionized gas injector that is downstream of the at least one dissolved air flotation unit.

22. The water treatment system of claim 21, further comprising at least one filter downstream of the at least one dissolved air flotation unit.

23. The water treatment system of claim 22, wherein the at least one filter is comprised of at least a duplex filter system.

24. The water treatment system of claim 1, further comprising a recirculation loop coupled to a downstream location of the water treatment system for recirculating water through the water treatment system if the water, after passing through the water treatment system, does not meet selected standards.

25. The water treatment system of claim 1, further comprising a disinfectant light source downstream of the dissolved air flotation unit.

26. The water treatment system of claim 1, further comprising an ozone generator downstream of the dissolved air flotation unit and configured to emit ozone into the water treatment system to contact the wastewater.

27. The water treatment system of claim 1, further comprising a solid waste treatment system comprising at least one separator for dewatering solids produced by the water treatment system and at least one incinerator for incinerating solids extracted from wastewater by the water treatment system.

28. The water treatment system of claim 1, further comprising at least one saturization system formed from a labyrinth of pipes upstream of the at least one dissolved air flotation unit for receiving at least one disinfectant and at least one ionized gas.

29. The water treatment system of claim 1, further comprising at least one oil/water separator for removing at least a portion of any oils present in the wastewater.

30. A water treatment system, comprising: at least one collection device for collecting wastewater containing contaminants; at least one filtration system upstream of the collection device for removing at least a portion of suspended solids from the wastewater; at least one disinfectant injector for injecting at least one disinfectant into the wastewater treatment system downstream of the at least one collection device; at least one disinfectant generator in communication with the at least one disinfectant injector for generating disinfectant materials from saltwater, the disinfectant generator comprising a housing containing a plurality of conduits having electrical cells for exposing electricity to saltwater flowing through the conduits; at least one mixer for mixing an ionized gas with the wastewater; at least one ionized gas injector coupled to the at least one mixer for injecting ionized gas into the wastewater in the at least one mixer; at least one ionized gas generator formed from a plurality of chambers, each chamber containing a plurality of ultraviolet lamps and each chamber adapted to allow a gas to pass the through the ionized gas generator; at least one electrical coagulation unit for applying an electrical current to the wastewater for removing at least a portion of the suspended solids; and at least one dissolved air flotation unit for removing suspended solids from the wastewater using microbubbles.

31. The water treatment system of claim 30, wherein the disinfectant generator further comprises a single inlet coupled to a header that distributes saltwater to the plurality of conduits and at least one of the conduits has a valve upstream of an electrical cell and a valve downstream of the electrical cell.

32. The water treatment system of claim 30, wherein the disinfectant generator further comprises at least one sensor positioned downstream of an electrical cell in at least one of the plurality of conduits.

33. The water treatment system of claim 30, wherein the disinfectant generator further comprises at least one bypass conduit for controlling flow of saltwater through the conduits of the disinfectant generator.

34. The water treatment system of claim 30, wherein the disinfectant generator comprises between about four conduits and about twenty conduits, each having an electrical cell.

35. The water treatment system of claim 30, wherein the plurality of ultraviolet lamps comprise between about one ultraviolet lamp and about twenty ultraviolet lamps extending from a first end of the ionized gas generator to a second end of the generator generally opposite to the first end.

36. The water treatment system of claim 35, wherein the plurality of chambers are coupled in parallel.

37. The water treatment system of claim 35, wherein the plurality of chambers forming the ionized gas generator comprises between about one chamber and about 90 chambers.

38. The water treatment system of claim 30, wherein the dissolved air flotation unit comprises a tank having an inlet positioned proximate to a bottom surface of the tank, a plurality of injectors proximate to the bottom surface of the tank for emitting microbubbles, and at least one contaminant removal device for removing suspended solids carried to the top of the unit by the microbubbles from the wastewater.

39. The water treatment system of claim 30, wherein the at least one filtration system comprises at least one drum screen with an automatic cleansing system.

40. The water treatment system of claim 30, wherein the electrical coagulation unit comprises a plurality of plates positioned generally parallel to each other and including a generally serpentine flow path between the plurality of plates.

41. The water treatment system of claim 30, wherein the at least one disinfectant injector comprises at least one first disinfectant injector positioned upstream of the electrical coagulation unit and at least one second disinfectant injector positioned downstream of the at least one dissolved air flotation unit.

42. The water treatment system of claim 41, wherein the first and second disinfectant injectors positioned upstream and downstream of the electrical coagulation unit each further comprise at least one disinfectant generator for generating disinfectant materials from saltwater, each comprising a housing containing a plurality of conduits having electrical cells for exposing electricity to the water flowing through the conduits.

43. The water treatment system of claim 41, further comprising at least one contact tank downstream of the second disinfectant injector.

44. The water treatment system of claim 30, further comprising at least one ionized gas injector downstream of the at least one dissolved air flotation unit for injecting ionized gas into the water treatment system.

45. The water treatment system of claim 44, further comprising at least one contact tank downstream of the ionized gas injector that is downstream of the at least one dissolved air flotation unit.

46. The water treatment system of claim 45, further comprising at least one filter downstream of the at least one dissolved air flotation unit.

47. The water treatment system of claim 46, wherein the at least one filter is comprised of at least a duplex filter system.

48. The water treatment system of claim 30, further comprising a recirculation loop coupled to a downstream location of the water treatment system for recirculating water through the water treatment system if the water, after passing through the water treatment system, does not meet selected standards.

49. The water treatment system of claim 30, further comprising a disinfectant light source downstream of the dissolved air flotation unit.

50. The water treatment system of claim 30, further comprising an ozone generator downstream of the dissolved air flotation unit and configured to emit ozone into the water treatment system to contact the wastewater.

51. The water treatment system of claim 30, further comprising a solid waste treatment system comprising at least one separator for dewatering solids produced by the water treatment system and at least one incinerator for incinerating solids extracted from wastewater by the water treatment system.

52. The water treatment system of claim 30, further comprising at least one saturization system formed from a labyrinth of pipes upstream of the at least one dissolved air flotation unit for receiving at least one disinfectant and at least one ionized gas.

53. The water treatment system of claim 30, further comprising at least one oil/water separator for removing at least a portion of any oils present in the wastewater.

54. A water treatment system, comprising:
- a collection device for collecting wastewater containing contaminants;
- a disinfectant injector for injecting a disinfectant into the wastewater treatment system, fluidly connected to and disposed downstream of the collection device;
- a disinfectant generator fluidly connected to disinfectant injector;
- an ionized gas mixer fluidly connected to and disposed downstream of the disinfectant injector;
- an ionized gas injector fluidly connected to the ionized gas mixer, for injecting ionized gas into the wastewater in the at least one mixer; and
- at least one dissolved air flotation unit for removing suspended solids from the wastewater using microbubbles, fluidly connected to and disposed downstream of the ionized gas mixer.

* * * * *